Jan. 12, 1960
D. L. JAFFE
2,921,263
CARD-TYPE THERMISTOR MOUNT
Filed Nov. 26, 1957
2 Sheets-Sheet 1
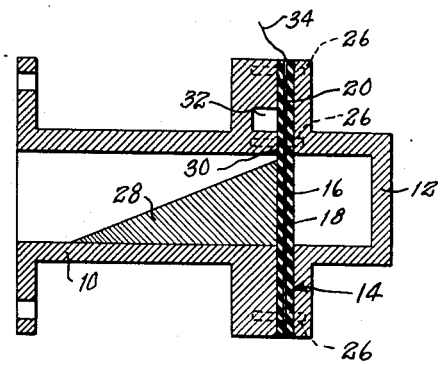
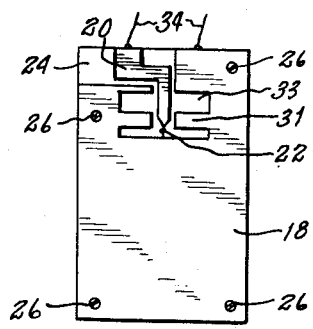 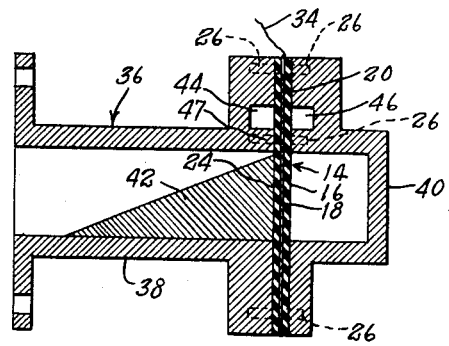
INVENTOR.
D. LAWRENCE JAFFE
BY Darby & Darby
ATTORNEYS Jan. 12, 1960     D. L. JAFFE     2,921,263
CARD-TYPE THERMISTOR MOUNT Filed Nov. 26, 1957     2 Sheets-Sheet 2

INVENTOR.
D. LAWRENCE JAFFE
BY Darby & Darby
ATTORNEYS

United States Patent Office 2,921,263
Patented Jan. 12, 1960

2,921,263

CARD-TYPE THERMISTOR MOUNT

David Lawrence Jaffe, Great Neck, N.Y., assignor to Polarad Electronics Corporation, Long Island City, N.Y., a corporation of New York Application November 26, 1957, Serial No. 699,112

16 Claims. (Cl. 324—95)

This invention relates to a thermistor mount of improved structural and electrical characteristics for use in measuring low values of microwave power. This application is a continuation-in-part of my copending application Serial No. 572,349, filed March 19, 1956, for "Thermistor Mount," which application is now abandoned.

It is an object of the present invention to provide a thermistor mount for use in microwave power-measuring apparatus in which the thermistor or other temperature sensitive resistance element may be readily replaced without the necessity of making soldered connections or accurate measurements or adjustments.

It is another object of the present invention to provide an improved thermistor mount for use in microwave power-measuring apparatus wherein the impedance of the thermistor is closely matched to that of the input transmission line and in which this match is maintained for wide variations in frequency.

It is another object of the present invention to provide an improved thermistor mount in which the thermistor is mounted in such a fashion as to absorb a great amount of the microwave power impinging therein without loss of the power by dissipation in shunt paths.

It is a further object of the present invention to provide a card-type thermistor mount wherein the effective reactance of the thermistor mount is substantially eliminated thus providing a mount capable of use over wide ranges of frequency without tuning.

It is a still further object of the present invention to achieve the immediate foregoing object by providing a thermistor mount in which compensating reactances may be placed substantially in the plane of the thermistor thus eliminating frequency sensitivity due to the transforming action of a length of transmission line between the unwanted thermistor reactance and the compensating reactance.

Other objects and advantages will be apparent from a consideration of the following description in conjunction with the appended drawings, in which:

Fig. 1 is a longitudinal vertical central cross-sectional view through one form of waveguide and thermistor according to the present invention;

Fig. 2 is a front elevational view of a printed circuit thermistor mounting element shown in cross-section in Fig. 1;

Fig. 3 is a longitudinal vertical central cross-sectional view through an alternative embodiment of the waveguide mounting structure for the printed circuit thermistor mounting element of Fig. 2;

Figure 4:
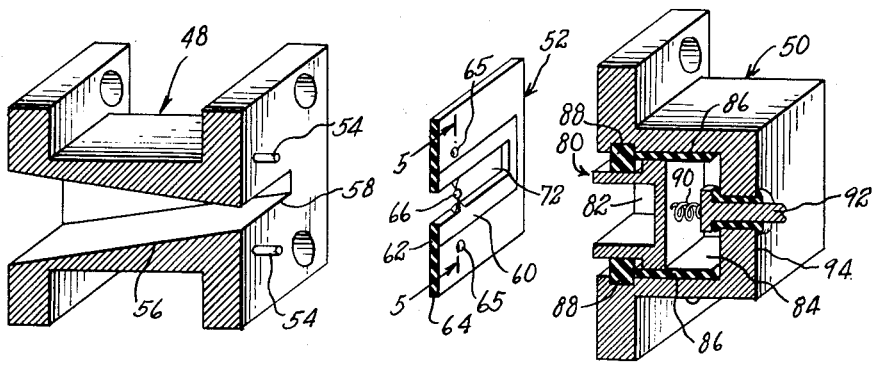
Fig. 4 is an exploded isometric sectional view of an alternative card-type thermistor mount and mounting structure according to the present invention.

As those skilled in the art appreciate, the design of a device for measuring low values of microwave power encounters several factors of the utmost importance. In the first place the impedance of the device must match that of the input transmission line so that the power reflections and the resultant voltage standing wave ratio (VSWR) are kept at a low value. This is of course necessary if accurate measurements are to be obtained. In such devices it is desirable that the impedance match be maintained over a large frequency range, with the result that conventional tuning adjustments are not practical since usually they are effective only over a narrow bandwidth.

As is well understood, a mount for such a device must be sensitive to facilitate ease and accuracy in measuring power at such low levels. From experience it is known that thermistors are very useful for sensitive microwave power measurements. However, the problem of achieving a broad-band impedance match, especially at extremely high microwave frequencies (one centimeter wavelength and shorter), has heretofore avoided solution without the use of manual tuning adjustments. One purpose of this invention is to provide a mount for a thermistor for this purpose by means of which manual tuning adjustments are avoided.

As is well understood, thermistors are very stable and rugged elements, especially when compared to other instruments used as power meters, such as barretters, hot wire bolometers, and the like. However, in using thermistors for this purpose there has not heretofore been provided a practical mount which will permit of easy replacement of the thermistor, especially in the field. There are presently available at K-band, for example, narrow band as they are, thermistor mounts requiring a soldering operation, the replacement of which anyone but the most dextrous and specially trained technician would be incapable. Therefore, another purpose of this invention is to provide a novel form of thermistor mount which can be replaced as a unit without requiring any special technical or manipulative skill in the field or elsewhere.

The various other problems suggested above are solved by means of the invention herein disclosed, which is based in part on the use of printed circuit techniques. The nature of the invention will be illustrated by the examples shown in the attached drawings.

Referring now to Figs. 1 and 2 showing the first form of the present invention, there is indicated at 10 one form of waveguide, in this case of rectangular form, used as the input transmission line for the microwave energy. The present invention is particularly adapted but not limited to use with waveguide-type transmission line. It could be adapted to use with coaxial or other types of transmission line as well. At 12 is a rear cavity termination for the waveguide. This termination element is designed to have a high input impedance throughout the operating frequency range. Clamped between the waveguide and the termination element is a card or wafer 14 which provides a mount for the thermistor. This wafer consists of a plate 16 of suitable insulating material having mounted thereon conductive sheets or coatings 18 and 20 which can be so mounted by any one of a number of available and known printed circuit procedures. A thermistor 22, preferably of the bead type, is connected to the elements 18 and 20 by very short leads, as shown. It is preferred to use a bead thermistor without the usual glass envelope.

Bead thermistors are temperature-sensitive resistance elements having a high degree of sensitivity and thus are generally preferable for use in the present apparatus. It will be understood, however, that other equivalent temperature-sensitive resistance elements might be utilized in place of the thermistor if desired.

The design which makes possible that the use of very short leads for the thermistor is of considerable importance because by it a reduction in the circuit inductance is effected, thereby enabling the attainment of a good impedance match. The use of short thermistor leads usually results in decreased sensitivity because of thermal losses. The construction herein disclosed, however, employing printed circuit practices, has a low thermal conductivity, with the result that the inherent sensitivity of the thermistor is not appreciably lowered.

The thermistor element, comprising the supporting plate 16, the conducting elements 18 and 20, and the thermistor bead 22, are made as a unitary structure which facilitates handling and installation.

As shown in Figure 1, this assembly is coupled into the transmission line by clamping it between the waveguide 10 and the termination element 12. It is preferred that a plate 24 of suitable dielectric characteristics be interposed between the end face of the transmission guide and the thermistor assembly unit. In order to properly lock all of these parts, it is desirable to provide dowel pins, as indicated at 26, either on the guide or the termination members for registry with suitably positioned holes in the thermistor assembly to insure accurate positioning of all of the elements. When properly placed in position, the thermistor bead 22 will be arranged in the waveguide where it will be subjected to and will absorb the RF energy in the waveguide. The RF energy will therefore be converted to a temperature change in the thermistor, which in turn causes a thermistor resistance change which may be detected by any suitable means.

It is desirable to use a tapered ridge 28 or other suitable impedance-transforming structure mounted in the waveguide to act as a microwave transformer to match the lower impedance of the thermistor bead to the impedance of the input waveguide 10. At this point it may be noted that the high impedance design of the termination element 12 causes negligible shunting of the thermistor in the assembly as illustrated. It should also be noted that among the materials suitable for the plate 24 are insulative plastic materials, such as that marketed under the trademark "Teflon."

Radio frequency leakage along the connections to the thermistor is prevented by means of an RF frequency choke arrangement such as shown. This arrangement consists of a low impedance section 30 and a high impedance section 32 in series therewith, each section being designed to be electrically one-quarter wavelength long at the center of the operating frequency range. The section 30 is caused to be of low impedance by the close spacing of the conductive layer 20 and layer 18 with respect to the waveguides 10 and 12. On the other hand the high impedance section 32 is formed by providing a large space between conductors at that section in accordance with well known transmission line theory.

In Fig. 3 there is shown an alternative waveguide mounting structure 36 for mounting a thermistor together with its disposable mount in a waveguide transmission line. The waveguide structure 36 is provided with a rear cavity 40 which serves as a termination for the waveguide. This termination element is designed to have a high input impedance and corresponds generally to the element 12 in Fig. 1. The wafer 14 utilized in conjunction with the mount 36 may be the same as that used with the mount shown in Fig. 1. Dowel pins 26 may be provided in a manner similar to that shown in Fig. 1. A tapered ridge 42 or other suitable impedance-transforming means may be utilized. The mounting structure 36 is provided with a cavity 44 corresponding to cavity 32 in Fig. 1 and is also provided with a second cavity 46 in the rear element 40 which has no counterpart in the waveguide mounting structure 10 of Fig. 1. Thus in the mounting structure 36 a high impedance section is formed by cavities 44 and 46 in cooperation with the opening 33 in the conductive layer 18. A low impedance section is formed in the area indicated at 47 by the walls of the waveguide structure 36 and by the extensions 31 of the conductive layer 18. As before the sections are each designed to be electrically one-quarter wavelength long at the center of the operating frequency range.

The alternative embodiment shown in Fig. 3 differs somewhat from that of Fig. 1 in that the filter sections formed at 44 and 46 and at 47 are in the nature of planar coaxial transmission line sections. The unique operation of the mounting card or wafer 14 with the waveguide mounting structure 36 thus forms an efficient thermistor mount including a microwave filter which is of exceptionally simple construction. Furthermore, the mounting card or wafer 14 is readily removable and may be replaced by a new wafer 14 thus replacing the thermistor 22 without the exercise of any special skill on the part of the personnel performing the operation.

Fig. 4 shows an alternative mounting structure for card-type thermistor mounts. The waveguide transmission line structure 48 is provided with terminating section 50. A thermistor mounting card 52 may be placed between these two structures and locater dowels or pins 54 may be provided which cooperate with locater holes 65 in the mounting card 52 to assure proper alignment of the various parts.

The input section of the waveguide transmission line structure includes a tapered transformer section 56 for matching the impedance of the thermistor mounting card to that of the waveguide. It should be understood that a different form of transforming section such as a rigid section, a stepped section or the like could be used as well.

The mounting card 52 has a conductive layer 60 on one side of a thin sheet of dielectric material 64 and a second conductive layer 62 on the other side of the dielectric material 64. The layer 62 (on the rear face of the card 52 as seen in Fig. 4) may cover the whole surface of the card. It is preferred, however, that the conductive layer 60 only cover the area of the card 52 surrounding the opening 72 in the card 52. In this manner the layer 62 will be in electrical contact with the waveguide structure 48 which may constitute an electrical ground. The layer 60, on the other hand, will be insulated for direct current purposes from the waveguide structure 48 and the terminating section 50. Other arrangements could of course be devised to ensure that no external direct current electrical path be provided between the conductive layers 60 and 62.

A thermistor bead 66 is mounted by soldering or otherwise conductively connecting one of its two conductive leads to each of the conductive layers 60 and 62. This is done in such a manner that, upon assembly in the waveguide structure, the thermistor bead is placed across the waveguide opening parallel to the direction of the electric field vector.

An opening 72 is provided in the card 52 and is shaped in such a manner as to eliminate all or part of the thermistor reactance. The fact that the thermistor reactance can readily be eliminated by the shaping of the hole 72 is an important part of the present invention.

Figure 5:
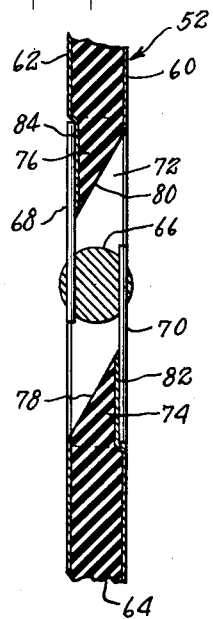
Fig. 5 is a vertical central cross-sectional fragmentary view of the card-type thermistor mount shown isometrically in Fig. 4.
Figure 6:
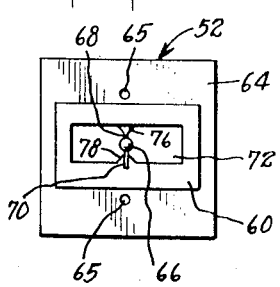
Fig. 6 is a front elevational view of the card-type thermistor mount shown in Figs. 4 and 5.

A particularly advantageous construction of the mounting card 52 may be seen by reference to Figs. 5 and 6. It will be noted that in this embodiment of the invention triangular nibs 76 and 78 are provided as parts of card 52 extending into the opening 72 and allowing the length of thermistor leads 68 and 70 to be very short. The nibs 76 and 78 may be sloped on their rear faces as shown at 78 and 80 to provide a minimum amount of structure extending into the opening 78. The nibs 76 and 78 have coatings forming continuations of layers 60 and 62, and by allowing a reduction of the length of the thermistor leads, decrease the inductance due to the thermistor leads and thus improve the frequency characteristics of the structure.

If desired the leads 68 and 70 may be impressed into the faces of the cards in depressions 82 and 84 as shown in Fig. 5 thus providing a more nearly smooth surface for the mounting card. It is not necessary to provide the depressions 82 and 84, however, and the leads 68 and 70 may simply be secured on flat faces of the mounting card 52.

It will be noted that while the leads 68 and 70 are effectively shortened in the structure shown in Figs. 5 and 6, a high degree of thermal isolation of the thermistor bead 66 is maintained since thermal conductivity through the nibs 76 and 78 will be very slight.

The thermistor mounting card shown in Figs. 5 and 6 is of such a shape that it produces an inductive effect and thus may be used to compensate for a capacitive effect caused by the thermistor bead 66, thus substantially eliminating any total reactance effect produced by the thermistor mount. If it is desired to add a shunt capacity, the card opening 72 may be made of smaller dimension than the waveguide opening in the direction of the electric field vector.

Figure 7:
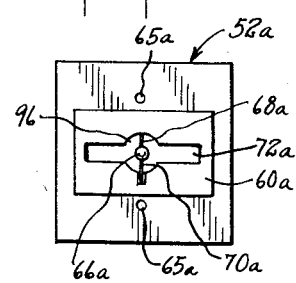
Fig. 7 is a front elevational view of an alternative card-type thermistor mount for use with the structure shown in Fig. 4.

A capacitive thermistor mounting card is shown at 52a in Fig. 7. The various parts of the card 52a are numbered with numbers corresponding to those used for the thermistor card 52 shown in Fig. 6 with the addition of the letter "a". It will be noted that the opening 72a in the card 52a is of different shape in that its general height is reduced and a generally circular enlargement 96 is provided for the mounting of the thermistor in the center of the opening 72a. The two mounting cards 52 and 52a are shown by way of illustrating the manner in which the cards may be modified to produce desired reactance effects substantially in the plane of the thermistor 66. It will be appreciated that the shape of the thermistor card 52 is not limited to those shown in 72 and 72a, but rather that the shape of the opening may be modified in many different ways to produce desired effects, all in accordance with known microwave transmission theory.

Having discussed the construction of the thermistor mounting card 52 and its effect upon the transmission of microwave energy in the microwave power measuring structure, the function of the termination structure 50 will now be explained with reference to Fig. 4. The terminating structure 50 is designed to provide a high-impedance shorted length of transmission line for terminating the waveguide structure 48 and also to provide a direct current or low frequency connection through the thermistor 66. Slidable member 80 is insulated from the remainder of the terminating structure 50 by strips of insulating material 86 and 88. The strips 86 and 88 also serve as bearing surfaces and guides for the movement of the slidable member 80. A spring 90 of conductive material is placed in contact with the rear of the slidable member 80 and in contact with the electrical lead 92 which passes through the rear wall of the terminating structure 50 and is electrically insulated therefrom by a bushing 94 of insulative material.

It should be explained that the insulative portions of the terminating structure such as the strips 86 and the bushing 94 are for the purpose of providing insulation for direct currents or low frequency alternating currents. If desired, the strips 86 and/or the bushing 94 may be made of a thin sheet of dielectric material thus providing a capacitive shunt path for microwave frequency currents.

From the foregoing explanation and from inspection of Fig. 4, it will be observed that when the complete thermistor mounting structure is assembled, the thermistor 66 will be placed in the path of the microwave radiation with its leads extending in the direction of the electrical vector, and that a direct current or low-frequency alternating current path will be provided through the lead 92, the spring 90, the slidable member 80, and the conductive layer 60 to the thermistor 66 and thence through the conductive layer 62 to the waveguide structure 48, which may constitute a direct current or low frequency ground for the system.

The device of Fig. 4 including either of the card-type thermistor cards shown in either Fig. 6 or 7 therefore provides a particularly simple and efficient thermistor mounting arrangement for the measurement of radio frequency power. The structure provides a particularly broad frequency response, and yet is of simple and inexpensive construction. Furthermore, when it is necessary to replace the thermistor 66 this may be done quickly and easily, simply by discarding the thermistor together with its mounting card 62 and replacing it with a new thermistor and mounting card. This process requires no particular skill and no difficulty can arise from misalignment of the thermistor in the waveguide.

Various embodiments of card type mounting structures for high microwave power-measuring apparatus have been shown and described. It will be appreciated however that many variations and modifications may be devised to the particular embodiment shown, all within the scope of the present invention. The scope of the present invention is therefore not to be construed to be limited to the particular embodiments shown, but is rather to be limited solely by the appended claims.

What is claimed is:

1. Apparatus for measuring radio frequency power comprising an input transmission line section, a termination transmission line section, a sheet of non-conductive material affixed between and across said transmission line sections, a first layer of conductive material on one surface of said sheet, a second layer of conductive material on the opposite surface of said sheet, at least one of said conductive layers having an opening therein generally corresponding in shape and position to the area of said transmission line occupied by a radio frequency field when in use, and a temperature-sensitive resistance element conductively connected across said opening between said first and second layers.

2. Apparatus for measuring radio frequency power comprising an input transmission line section, a termination transmission line section, a sheet of non-conductive material having an opening therein affixed between and across said transmission line sections, a first layer of conductive material on one surface of said sheet, a second layer of conductive material on the opposite surface of said sheet, at least one of said conductive layers having an opening therein generally corresponding in shape and position to the area of said transmission line occupied by a radio frequency field when in use, and a temperature sensitive resistance element affixed in the opening in said sheet and conductively connected between said first and second layers.

3. Apparatus for measuring radio frequency power comprising an input transmission line section, a termination transmission line section, a sheet of non-conductive material having an opening therein affixed between and across said transmission line sections, a first layer of conductive material on one surface of said sheet, a second layer of conductive material on the opposite surface of said sheet, at least one of said conductive layers having an opening therein generally corresponding in shape and position to the area of said transmission line occupied by a radio frequency field when in use, and a bead thermistor affixed in the opening in said sheet and conductively connected between said first and second layers.

4. Apparatus for measuring radio frequency power comprising an input transmission line section, a termination transmission line section, a sheet of non-conductive material having an aperture therein affixed between and across said transmission line sections, a first layer of conductive material on one portion of said sheet, a second layer of conductive material on another portion of said sheet, and a temperature sensitive resistance element mounted across said aperture and conductively connected between said first and second layers.

5. Apparatus for measuring radio frequency power comprising an input transmission line section, a termination transmission line section, a sheet of non-conductive material affixed between and across said transmission line sections, said sheet of material having an aperture therein located in the area occupied by a radio frequency field in said transmission line section, a first layer of conductive material on one surface of said sheet, a second layer of conductive material on the other surface of said sheet, a temperature sensitive resistance element conductively connected between said layers and across the aperture in said sheet in the direction of the electrical field in said transmission line sections, and means for making electrical connections to said layers.

6. Apparatus for measuring radio frequency power comprising an input waveguide section, a termination waveguide section, a sheet of non-conductive material affixed between and across said waveguide sections, said sheet of material having an aperture therein located in the area occupied by a radio frequency field in said transmission line section, a first layer of conductive material on one surface of said sheet, a second layer of conductive material on the other surface of said sheet, a thermistor conductively connected between said layers and across the aperture in said sheet in the direction of the electrical field in said transmission line sections, and means for making electrical connections to said layers.

7. Apparatus for measuring radio frequency power comprising an input transmission line section, a termination transmission line section, a sheet of non-conductive material affixed between and across said transmission line sections, said sheet of material having an aperture therein located in the area occupied by a radio frequency field in said transmission line section, a first layer of conductive material on one surface of said sheet, a second layer of conductive material on the other surface of said sheet, one of said two layers being in direct current electrical contact with at least one of said transmission line sections and the other of said two layers being electrically insulated against direct current flow from said transmission line sections, a temperature sensitive resistance element conductively connected between said layers and across the aperture in said sheet in the direction of the electrical field in said transmission line sections, and means for making an electrical connection to said other layer.

8. Apparatus for measuring radio frequency power comprising an input transmission line section, a termination transmission line section, a sheet of non-conductive material affixed between and across said transmission line sections, said sheet of material having an aperture therein located in the area occupied by a radio frequency field in said transmission line section, a first layer of conductive material on one surface of said sheet, a second layer of conductive material on the other surface of said sheet, one of said two layers being in direct current electrical contact with at least one of said transmission line sections and the other of said two layers being electrically insulated against direct current flow from said transmission line sections, a temperature sensitive resistance element conductively connected between said layers and across the aperture in said sheet in the direction of the electrical field in said transmission line sections, and means for making an electrical connection to said other layer, said means comprising a slidable element slidably and insulatedly mounted in said termination waveguide section, a spring of conductive material arranged to urge said slidable element into contact with said sheet, and an electrical lead connected to said spring and extending through and insulated from said termination waveguide sections, whereby said temperature sensitive element is mounted in the radio frequency field in said transmission line section and an electrical circuit is provided through said temperature sensitive resistance element to allow the resistance of said element and hence the microwave power in said input transmission line section to be measured.

9. A mounting card for mounting a thermistor in a radio frequency transmission line comprising a sheet of non-conductive material having an aperture therein, said aperture generally corresponding in shape to the area of said radio frequency transmission line occupied by a radio frequency field, a first layer of conductive material on one surface of said sheet, a second layer of conductive material on the other surface of said sheet and a thermistor mounted across said aperture and conductively connected between said layers.

10. A mounting card for mounting a thermistor in a radio frequency transmission line comprising a sheet of non-conductive material having an aperture therein, said aperture generally corresponding in shape to the area of said radio frequency transmission line occupied by a radio frequency field, a first layer of conductive material on one surface of said sheet, a second layer of conductive material on the other surface of said sheet and a thermistor having two leads mounted across said aperture, one of said leads being conductively connected to said first layer and the second of said leads being conductively connected to said second layer.

11. A mounting card for mounting a thermistor in a radio frequency transmission line comprising a sheet of non-conductive material having an aperture therein, said aperture generally corresponding in shape to the area of said radio frequency transmission line occupied by a radio frequency field, a first layer of conductive material on one surface of said sheet, a second layer of conductive material on the other surface of said sheet, said sheet having extensions protruding into said aperture, one of said extensions having a continuation of said first layer of conductive material thereon and the other of said extensions having a continuation of said second layer of conductive material thereon, and a thermistor mounted between said extensions in said aperture and conductively connected between said layers of conductive material.

12. A mounting card for a thermistor comprising a sheet of non-conductive material having a rectangular aperture therein, a first layer of conductive material on one surface of said sheet, a second layer of conductive material on the other surface of said sheet, said sheet having triangular extensions protruding into said aperture, one of said extensions having a continuation of said first layer of conductive material thereon and the other of said extensions having a continuation of said second layer of conductive material thereon, and a thermistor mounted between said extensions in said aperture and conductively connected between said layers of conductive material.

13. A mounting card for mounting a thermistor in a radio frequency transmission line comprising a sheet of non-conductive material having an aperture therein, said aperture having an enlargement in the center thereof, said aperture generally corresponding in shape to the area of said radio frequency transmission line occupied by a radio frequency field but somewhat smaller in size, a first layer of conductive material on one surface of said sheet, a second layer of conductive material on the other surface of said sheet, and a thermistor mounted in the center of said enlarged portion of said aperture and conductively connected between said layers of conductive material.

14. A mounting card for mounting a thermistor in a radio frequency transmission line comprising a sheet of non-conductive material having a rectangular aperture therein, said aperture generally corresponding in shape to the area of said radio frequency transmission line occupied by a radio frequency field but somewhat smaller in size, said aperture having a generally circular enlargement in the center thereof, a first layer of conductive material on one surface of said sheet, a second layer of conductive material on the other surface of said sheet, and a thermistor mounted in the center of said enlarged portion of said aperture and conductively connected between said layers of conductive material.

15. Apparatus for measuring radio frequency power comprising an input transmission line section, a termination transmission line section, a sheet of non-conductive material having an aperture therein and affixed between and across said transmission line sections, at least a part of said aperture being located in the area occupied by a radio frequency field in said transmission line section when in use, a first layer of conductive material on one portion of said sheet, a second layer of conductive material on another portion of said sheet, a high temperature coefficient of resistance element having a body portion and relatively small-diameter conductive leads attached thereto mounted across at least said part of said aperture located in the area occupied by a radio frequency field in said transmission line section when in use, said leads being conductively and physically attached respectively to said first and second layers at points on said leads near the body portion of said resistance element and means for making electrical connections to said layers.

16. Apparatus for measuring radio frequency power comprising an input transmission line section, a termination transmission line section, a sheet of non-conductive material affixed between and across said transmission line sections, a first layer of conductive material on one portion of said sheet, a second layer of conductive material on another portion of said sheet, at least one of said conductive layers having an opening therein at least a part of which is generally corresponding in shape and position to the area of said transmission line occupied by a radio frequency field when in use, and a temperature sensitive resistance element conductively connected across at least a part of said opening between said first and second layers, said part being in the area of said transmission line occupied by a radio frequency field when in use, said layers being shaped to form a transmission line extending from said resistance element, said layers being closely spaced along a portion of said transmission line and widely spaced along a different portion of said transmission line, thereby forming portions of a radio frequency choke for blocking the leakage of radio frequency energy from said temperature sensitive element.

References Cited in the file of this patent

UNITED STATES PATENTS

| | | |
|---|---|---|
| 2,547,022 | Leno | Apr. 3, 1951 |
| 2,557,122 | Leiphart | June 19, 1951 |
| 2,602,828 | Norton | July 8, 1952 |
| 2,624,803 | Howard | Jan. 6, 1953 |
| 2,633,493 | Cohn | Mar. 31, 1953 |
| 2,667,618 | Waller et al. | Jan. 26, 1954 |
| 2,799,826 | Eberle | July 16, 1957 |